United States Patent
Pasternack

(10) Patent No.: US 9,830,313 B2
(45) Date of Patent: *Nov. 28, 2017

(54) IDENTIFYING EXPANDING HASHTAGS IN A MESSAGE

(71) Applicant: Facebook, Inc., Menlo Park, CA (US)

(72) Inventor: Jeffrey William Pasternack, Belmont, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/489,493

(22) Filed: Apr. 17, 2017

(65) Prior Publication Data

US 2017/0220556 A1    Aug. 3, 2017

Related U.S. Application Data

(63) Continuation of application No. 14/587,651, filed on Dec. 31, 2014, now Pat. No. 9,646,263.

(51) Int. Cl.
| | |
|---|---|
| *G06F 17/27* | (2006.01) |
| *G06N 7/00* | (2006.01) |
| *G06N 99/00* | (2010.01) |
| *G06Q 50/00* | (2012.01) |

(52) U.S. Cl.
CPC ........ *G06F 17/2775* (2013.01); *G06F 17/277* (2013.01); *G06F 17/2785* (2013.01); *G06N 7/005* (2013.01); *G06N 99/005* (2013.01); *G06Q 50/01* (2013.01)

(58) Field of Classification Search
USPC ....................................... 704/1–10, 203–277
See application file for complete search history.

(56) References Cited

U.S. PATENT DOCUMENTS

| | | | |
|---|---|---|---|
| 9,336,192 B1* | 5/2016 | Barba | G06F 17/277 |
| 2012/0166931 A1* | 6/2012 | Alonso | G06Q 30/0201 715/234 |
| 2013/0159219 A1 | 6/2013 | Pantel et al. | |

(Continued)

OTHER PUBLICATIONS

United States Office Action, U.S. Appl. No. 14/587,651, dated Jul. 11, 2016, 19 pages.

(Continued)

*Primary Examiner* — Marcellus Augustin
(74) *Attorney, Agent, or Firm* — Fenwick & West LLP

(57) ABSTRACT

A social networking system receives messages from users that include hashtags. The social networking system may use a natural language model to identify terms in the hashtag corresponding to words or phrases of the hashtag. The words or phrases may be used to modify a string of the hashtag. The social networking system may also generate computer models to determine likely membership of a message with various hashtags. Prior to generating the computer models, the social networking system may filter certain hashtags from eligibility for computer modeling, particularly hashtags that are not frequently used or that more typically appear as normal text in a message instead of as a hashtag. The social networking system may also calibrate the computer model outputs by comparing a test message output with outputs of a calibration group that includes positive and negative examples with respect to the computer model output.

18 Claims, 5 Drawing Sheets

(56) References Cited

U.S. PATENT DOCUMENTS

| | | | |
|---|---|---|---|
| 2013/0298038 A1* | 11/2013 | Spivack | H04L 65/403 |
| | | | 715/753 |
| 2015/0046452 A1* | 2/2015 | Agrawal | G06F 17/30241 |
| | | | 707/737 |
| 2015/0142888 A1* | 5/2015 | Browning | H04L 12/1831 |
| | | | 709/204 |
| 2015/0193482 A1* | 7/2015 | Kaushansky | G06F 17/30716 |
| | | | 707/741 |
| 2015/0227624 A1 | 8/2015 | Busch et al. | |
| 2015/0317069 A1 | 11/2015 | Clements et al. | |
| 2016/0042284 A1* | 2/2016 | Menczer | G06Q 30/0202 |
| | | | 706/46 |

OTHER PUBLICATIONS

United States Office Action, U.S. Appl. No. 14/587,651, dated Jan. 4, 2016, 20 pages.

* cited by examiner

| Hashtag Data Table 500 ||||
|---|---|---|---|
| Hashtag | Hashtag Phrase | Quantity of Hashtag | Quantity of Hashtag Phrase |
| #40yardTDforthewin | 40 yard TD for the win | 50 | 4 |
| #RaidersNation | Raiders Nation | 5,000 | 7,500 |
| #DrillBabyDrill | Drill Baby Drill | 6,500 | 9,430 |
| #Obama | Obama | 78,951 | 998,123 |

| Hashtag Data Table 510 |||
|---|---|---|
| Hashtag | Near-term Quantity | Historic Quantity |
| #RaidersNation | 75 | 5 |
| #Obama | 150 | 152 |

FIG. 5

| Calibration Table 700 | | | | | | | | | | | | | |
|---|---|---|---|---|---|---|---|---|---|---|---|---|---|
| Hashtag Present? | N | N | Y | N | N | N | Y | N | Y | Y | Y | N | Y | Y |
| Calibration Values | 0.15 | 0.18 | 0.21 | 0.25 | 0.27 | 0.35 | 0.40 | 0.45 | 0.60 | 0.67 | 0.70 | 0.76 | 0.80 | 0.82 |

IDENTIFYING EXPANDING HASHTAGS IN A MESSAGE

CROSS REFERENCE TO RELATED APPLICATION

This application is a continuation of co-pending U.S. application Ser. No. 14/587,651, filed Dec. 31, 2014, which is incorporated by reference in its entirety.

BACKGROUND

This invention relates generally to identifying content in messages, and in particular to training computer models for identifying hashtags in a message.

Hashtags have become a popular way for users to add topics, keywords, or ideas to a message. For example, a user may insert various hashtags in a message: "Watching the #olympics and the #100mswim, #goteam #lovetheolympics." As shown by this example, users may, and frequently do, add several hashtags to a single message, and in some examples, users may use a hashtag for every word in a message: "#this #is #the #bestalbum #ever." As a result, hashtag data in messages is very noisy, and correctly analyzing hashtags in messages is difficult. In particular, it is challenging to determine which hashtags may be successfully predicted using a classifier or computer model. In addition, hashtags often correspond to terms that may otherwise be components of the message that are not currently accounted for in a feature set describing the message. Because such feature sets are often sparse, trained classifiers are often inadequate at providing an effective prediction of whether their output will accurately describe the probability of a message belonging to a hashtag.

SUMMARY

A social networking system receives messages and other content items that include hashtags. A message includes a string of characters, some of which may comprise a hashtag. A hashtag is portion of the string of characters that begins with a designated character, such as a hash "#" character, and may be used by users to describe portions of a message. The social networking system performs several functions to aid in the analysis and use of hashtags in the social networking system, for example to automatically identify when a hashtag may be applicable to a message that does not include the hashtag.

To perform analysis that accounts for content of the message and includes the meaning of the hashtag, the social networking system manipulates the hashtag to be used for the analysis. The social networking system expands the hashtag in-line in the copy of the message. In performing the expansion, the hashtag is replaced with words or characters of the hashtag. For example, a hashtag #BestDayEver may be expanded to the string "Best Day Ever" and included in the character string of the message for further analysis. To perform this expansion, the social networking system trains an n-gram language model to identify natural sequences of language within a string, in this case the hashtag content. The n-gram language model is trained on content items of the social networking system, which trains the model to learn the words and relative frequency of word use in the social networking system. When the hashtag is provided to the n-gram language model, it provides a hashtag phrase corresponding to the identified words and phrases in the hashtag.

To generate the hashtag phrase, the n-gram language model determines a set of candidate phrases for the hashtag by identifying possible words or phrases within the hashtag. The computer model scores the candidate phrases based on the frequency of the candidates phrases in the messages used to train the computer model. After scoring the candidate phrases, the highest-scoring candidate phrase is selected as the hashtag phrase for the hashtag.

The hashtag phrase is inserted in the string to replace the hashtag in the message string to generate an expanded string including the hashtag phrase. This permits the contents of the hashtag to be analyzed as a part of the string of the message. For example, the analysis may be used to identify a topic or social networking object that may be related to the message. This permits user interactions with the message to be associated with the identified topic or social networking object for the hashtags of the object and the social networking system to more accurately describe these user interactions.

The social networking system also trains computer models to identify when a hashtag is applicable to a message that does not have that hashtag. The social networking system may generate thousands, tens of thousands, or more hashtag computer models automatically in order to perform this analysis. In order to generate computer models that are meaningful and relevant to the user, the universe of hashtags present in messages may be filtered to generate a set of hashtags eligible for training. The filters generally exclude hashtags that would be difficult to train or likely would not produce useful results. As example filters, a hashtag may be excluded as an eligible hashtag when there are too few instances of the hashtag used in messages. In another example, a frequency filter excludes a hashtag by comparing a count of the number of times a hashtag is used with the number of times that a word or phrase corresponding to the hashtag is used. The word or phrase may be the hashtag phrase identified by expanding the hashtag. This comparison generates a ratio of the hashtag occurrences compared to the word or phrases associated with the hashtag. When the ratio is lower than a threshold, this filter excludes the hashtag from the eligible hashtags. The frequency filter excludes hashtags that are not frequently used as hashtags, and instead typically appear as the corresponding word or phrase, suggesting users typically do not associate a hashtag with that word or phrase. In another filter, a trendiness filter excludes hashtags as an eligible hashtag when that hashtag is not particularly popular relative to prior uses of that hashtag. The number of times a hashtag is used recently is compared with the number of times the hashtag has been used in the recent past. This provides an indication of whether the hashtag is becoming more popular, and the trendiness filter excludes those hashtags from eligibility that do not occur more frequently than they did in the past.

When a computer model has been trained for a hashtag, the social networking system may calibrate the classifier results. When training the classifiers, the social networking system identifies a training set and a calibration set of messages. These sets each include positive and negative examples of the hashtag. The positive examples may include an expanded string that expands the existing hashtag to permit the positive training set to include messages that had the hashtag, but not require the actual use of the hashtag in the message. For example, "Great #Giants game" may be expanded to "Great Giants game" for use in the training. The training set of messages is used to train the computer model. The calibration set of messages is entered as an input to the computer model to determine the computer model's prediction of whether the calibration messages belong to the hashtag. The computer model outputs a calibration score for each calibration message, which is associated with whether the calibration message was a positive or negative example. To determine whether a test message belongs to the hashtag, the test message is provided to the computer model which outputs a test value for the test message. The test value indicates computer model's prediction of whether the test message belongs to the hashtag.

To determine a probability that the test message belongs in the hashtag, a group of calibration scores that are within a range of the test value are identified. Next, the percentage of calibration messages in the group that belong to the hashtag (were positive examples) is determined. This percentage is used as the probability that the test message belongs to the hashtag. By determining whether similarly-scored calibration messages were actually positive, the actual predictive ability of the model for that range of score result can be more accurately modeled.

In another embodiment, the calibration scores are used to generate a mapping between the computer model output and the actual percentage of calibration messages that belong to the hashtag at various test values. When a test value is received, the mapping is applied to the test value to determine an adjusted test value. Since the computer models may have been trained on sparse and incomplete data, the application of calibration scores can provide an improved estimate of the model's accuracy.

By generating computer models and calibrating the results, the social networking system may use the hashtag models to predict whether a hashtag should be associated with a message. For example, the hashtag may be suggested to the user for inclusion in the message when a user composes the message, or the hashtag may be used to associate the message with the topics or social networking objects associated with the hashtag. This association may be used for various purposes in the social networking system, such as a tailoring a newsfeed for a user.

BRIEF DESCRIPTION OF THE DRAWINGS

FIG. 5 shows a hashtag data table used in some example filters for filtering eligible hashtags from a computer model.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
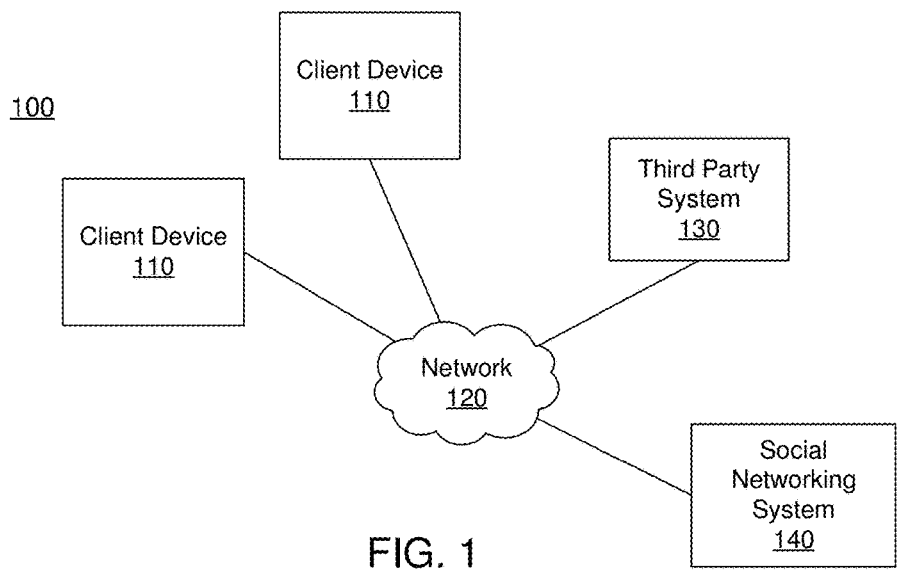
FIG. 1 is a high level block diagram of a system environment for a social networking system.

FIG. 1 is a high level block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100. The embodiments described herein can be adapted to online systems that are not social networking systems. The social networking system 140 analyzes messages and other user interactions to identify topics, social networking objects, and other aspects of a message to better understand user behavior and interests.

The social networking system 140 provides analysis and prediction of hashtags for messages within the social networking system 140. A message as used herein is a portion of a content item that includes a string of textual characters. For example, messages may be included in a status update, a photo description, or a check-in, among other example content items further described below. The social networking system 140 analyzes the hashtags to determine the content of the hashtag within a message, for example to better determine the topics or interests associated with the hashtag, as well as to make predictions of the hashtags that may be applied to a message. The hashtag analysis may also be applied to customize content for a user, for example to customize a newsfeed or other content for a user based on hashtags that the user has used and the topics associated with those hashtags.

A hashtag is typically at least a portion of a string of characters for a message that begins with a specific character, such as a hash character (#). As an example, in the string "Great game at #ATTPark today, the #Giants cleaned up 7-2" there are two hashtags, "#ATTPark" and "#Giants." In typical use, a hashtag is ended by any whitespace character such as a space. Thus, while a hashtag may include multiple words, such as "#RaiderNation," these words are typically not delineated by spaces in the hashtag. Often, users will also use arbitrary characters or abbreviations that may not correspond to standard dictionary words or use letters that could be interpreted as several different words. For example, #damnation could be interpreted as several different words, including "damnation" "dam" "nation" "damn" "at" and "ion." The social networking system 140 identifies a hashtag phrase representing identified words and characters from the hashtag. The hashtag phrase may be used to replace the hashtag in the message when performing various analysis of the message.

In addition, the social networking system 140 generates computer models to identify hashtags that may be applicable to a message. The social networking system 140 generates a computer model for a subset of all hashtags included in messages, and applies filters to exclude hashtags from the subset of hashtags based on various attributes of the hashtags. These filters prevent overselection of hashtags in the predictions for hashtags that may be applied to a message. Without these filters, there is a risk that a message is associated with hashtags that are not interesting to users of the social networking system, and may inaccurately suggest these hashtags for a user to use with a message.

When training the computer models, the social networking system 140 may also retain a calibration set of messages and use the calibration set to generate calibration values for the hashtag computer model. When a new message is evaluated by the computer model for a hashtag, the calibration values are used to determine the likelihood that the message belongs to the hashtag by comparing the resulting test value of the message to similarly-scoring calibration values.

These features of the social networking system 140 are described in further detail below and with respect to the accompanying figures.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content, advertising, or other information for presentation via a client device 110.

Figure 2:
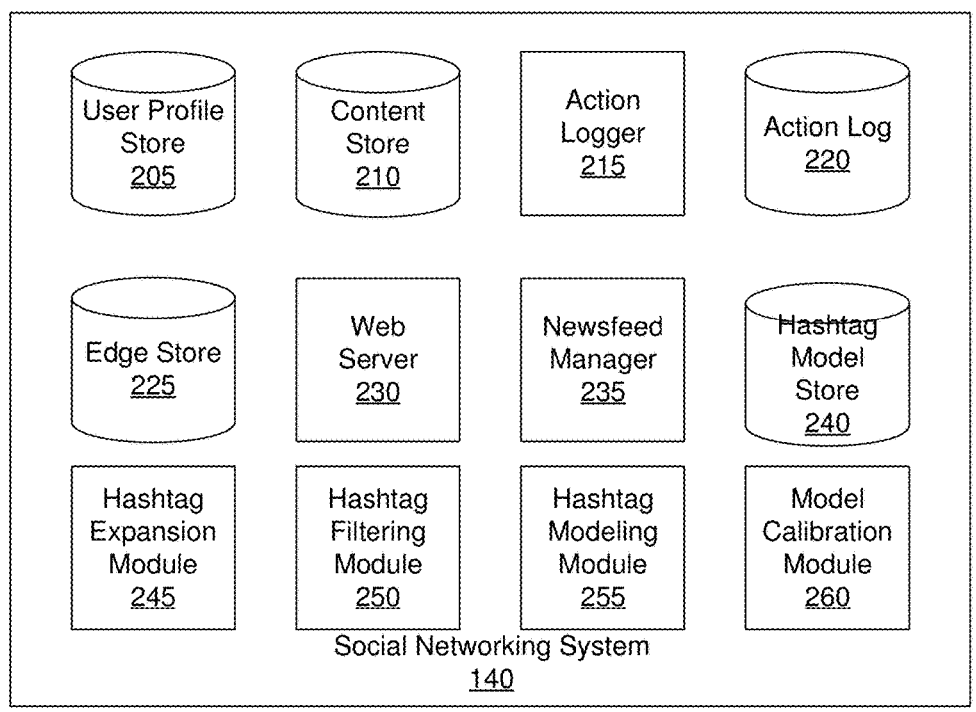
FIG. 2 is an example block diagram of an architecture of the social networking system 140.

FIG. 2 is an example block diagram of an architecture of the social networking system 140. The social networking system 140 shown in FIG. 2 includes a user profile store 205, a content store 210, an action logger 215, an action log 220, an edge store 225, web server 230, newsfeed manager 235, hashtag model store 240, hashtag expansion module 245, hashtag filtering module 250, hashtag modeling module 255, and hashtag calibration module 260. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding user of the social networking system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 140 displayed in an image. A user profile in the user profile store 205 may also maintain references to actions by the corresponding user performed on content items in the content store 210 and stored in the action log 220.

In addition to user-provided information, the social networking system 140 may also receive information from third parties describing users of the social networking system. For example, the social networking system 140 may receive information from a data aggregator that collects demographics, purchasing, and advertising information about users. This information may be stored by the social networking system 140 and used in analyzing groups of customers as an audience for an advertiser. The purchasing information may indicate, for example, that a user is considered in-market for a particular item, or that a user has recently purchased specific items. The information received from data aggregators may be partially anonymized from the data aggregator, and prevent specific identification of social networking system users. For example, a data aggregator may describe characteristics of a group of individuals, rather than specific individuals within the group.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system, events, groups, or applications. In some embodiments, objects are received from third-party applications or third-party applications separate from the social networking system 140. In one embodiment, objects in the content store 210 represent single pieces of content or content "items." Hence, users of the social networking system 140 are encouraged to communicate with each other by posting text and content items of various types of media through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 210. Examples of interactions with objects include: commenting on posts, sharing links, and checking-in to physical locations via a mobile device, accessing content items, and any other interactions. Additional examples of interactions with objects on the social networking system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user profile of the user and allowing a more complete understanding of user preferences.

The action log 220 may also store user actions taken on a third party system 130, such as an external website, and communicated to the social networking system 140. For example, an e-commerce website that primarily sells sporting equipment at bargain prices may recognize a user of a social networking system 140 through a social plug-in enabling the e-commerce website to identify the user of the social networking system 140. Because users of the social networking system 140 are uniquely identifiable, e-commerce websites may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, an edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system, sharing a link with other users of the social networking system, and commenting on posts made by other users of the social networking system.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the content store 210. An advertisement request includes advertisement content and a bid amount. The advertisement content is text, image, audio, video, or any other suitable data presented to a user. The advertisements may include an advertisement to purchase a restricted gift for another user. In various embodiments, the advertisement content also includes a landing page specifying a network address to which a user is directed when the advertisement is accessed. The bid amount is associated with an advertisement by an advertiser and is used to determine an expected value, such as monetary compensation, provided by an advertiser to the social networking system 140 if the advertisement is presented to a user, if the advertisement receives a user interaction, or based on any other suitable condition. For example, the bid amount specifies a monetary amount that the social networking system 140 receives from the advertiser if the advertisement is displayed and the expected value is determined by multiplying the bid amount by a probability of the advertisement being accessed.

Additionally, an advertisement request may include one or more targeting criteria specified by the advertiser. Targeting criteria included in an advertisement request specify one or more characteristics of users eligible to be presented with content in the advertisement request. For example, targeting criteria are a filter to apply to fields of a user profile, edges, and/or actions associated with a user to identify users having user profile information, edges or actions satisfying at least one of the targeting criteria. Hence, the targeting criteria allow an advertiser to identify groups of users matching specific targeting criteria, simplifying subsequent distribution of content to groups of users.

In one embodiment, the targeting criteria may specify actions or types of connections between a user and another user or object of the social networking system 140. The targeting criteria may also specify interactions between a user and objects performed external to the social networking system 140, such as on a third party system 130. For example, the targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in the targeting criteria allows advertisers to further refine users eligible to be presented with content from an advertisement request. As another example, targeting criteria may identify users having a connection to another user or object or having a particular type of connection to another user or object.

In one embodiment, the social networking system 140 identifies stories likely to be of interest to a user through a "newsfeed" presented to the user. A story presented to a user describes an action taken by an additional user connected to the user and identifies the additional user. In some embodiments, a story describing an action performed by a user may be accessible to users not connected to the user that performed the action. The newsfeed manager 235 may generate stories for presentation to a user based on information in the action log 220 and in edge store 225 or may select candidate stories included in content store 210. One or more of the candidate stories are selected and presented to a user by the newsfeed manager 235.

For example, the newsfeed manager 235 receives a request to present one or more stories to a social networking system user. The newsfeed manager 235 accesses one or more of the user profile store 205, the content store 210, the action log 220, and the edge store 225 to retrieve information about the identified user. For example, stories or other data associated with users connected to the identified user are retrieved. The retrieved stories or other data is analyzed by the newsfeed manager 235 to identify content likely to be relevant to the identified user. For example, stories associated with users not connected to the identified user or stories associated with users for which the identified user has less than a threshold affinity are discarded as candidate stories. Based on various criteria, the newsfeed manager 235 selects one or more of the candidate stories for presentation to the identified user.

In various embodiments, the newsfeed manager 235 presents stories to a user through a newsfeed, which includes a plurality of stories selected for presentation to the user. The newsfeed may include a limited number of stories or may include a complete set of candidate stories. The number of stories included in a newsfeed may be determined in part by a user preference included in user profile store 205. The newsfeed manager 235 may also determine the order in which selected stories are presented via the newsfeed. For example, the newsfeed manager 235 determines that a user has a highest affinity for a specific user and increases the number of stories in the newsfeed associated with the specific user or modifies the positions in the newsfeed where stories associated with the specific user are presented.

The newsfeed manager 235 may also account for actions by a user indicating a preference for types of stories and selects stories having the same, or similar, types for inclusion in the newsfeed. Additionally, newsfeed manager 235 may analyze stories received by social networking system 120 from various users and obtains information about user preferences or actions from the analyzed stories. This information may be used to refine subsequent selection of stories for newsfeeds presented to various users.

The web server 230 links the social networking system 140 via the network 120 to the one or more client devices 110, as well as to the one or more third party systems 130. The web server 140 serves web pages, as well as other web-related content, such as JAVA®, FLASH®, XML, and so forth. The web server 230 may receive and route messages between the social networking system 140 and the client device 110, for example, instant messages, queued messages (e.g., email), text messages, short message service (SMS) messages, or messages sent using any other suitable messaging technique. A user may send a request to the web server 230 to upload information (e.g., images or videos) that are stored in the content store 210. Additionally, the web server 230 may provide application programming interface (API) functionality to send data directly to native client device operating systems, such as IOS®, ANDROID™, WEBOS®, or RIM®.

The hashtag model store 240 stores trained computer models that identify messages as belonging to hashtags. Each computer model is associated with a hashtag and receives a feature vector associated with a message and outputs a measure that the message belongs to the hashtag. The computer model is trained by the hashtag modeling module 255 based on a positive training set and a negative training set associated with the hashtag. The computer model may be any suitable computer learning mechanism, such as a neural network, logistic regression, convolutional networks, and TagSpace. Further details regarding TagSpace are described in "#TagSpace: Semantic Embeddings from Hashtags" at the Proceedings of the 2014 Conference on Empirical Methods in Natural Language Processing, pp. 1822-2827, which is hereby incorporated by reference in its entirety. The feature vector for the message may comprise various information relating to the message, such as the content of the message, topics associated with the message, and various objects associated with the message. As described more fully below, the feature vectors for a message may include an expanded string of characters that account for an expanded hashtag. When the computer model outputs the measure that the message belongs to the hashtag, the social networking system 140 may use the output to determine whether to suggest the hashtag to the user for applying to the message, identifying a topic related to the hashtag, or otherwise applying the hashtag to the message.

The hashtag expansion module 245 analyzes hashtags in a message to identify a hashtag phrase that corresponds to the hashtag. The hashtag phrase may be used for various purposes, such as to modify the message string for a feature vector of the message or to determine whether to generate a computer model for the hashtag. To identify the hashtag, the hashtag expansion model 245 provides the hashtag to an n-gram natural language model. The n-gram natural language model identifies a series of words (n-grams) that sequentially follow one another in the hashtag string. In one example, the number of n-grams processed by the model is in the range of 6-10. The identified words for the hashtag are termed a hashtag phrase for the hashtag. Many hashtags include several words, and the hashtag may be amenable to several interpretations, one of which is selected by the natural language model to generate the hashtag phrase. For example, a hashtag "#damnation" may be identified by the natural language model as most likely matching the phrase "dam" "nation" as a result of matching the terms and frequency of the training data for the natural language model.

To train the natural language model, a sample of messages in the social networking system 140 are identified, for example the messages provided by users within a period of time, such as the last few weeks or months. The natural language model is trained to identify the words used in the messages and the relative ordering and frequency. Since the natural language model is trained on messages in the social networking system 140, the natural language model develops a vocabulary that is consistent with the terms used by users of the social networking system.

Figure 3:
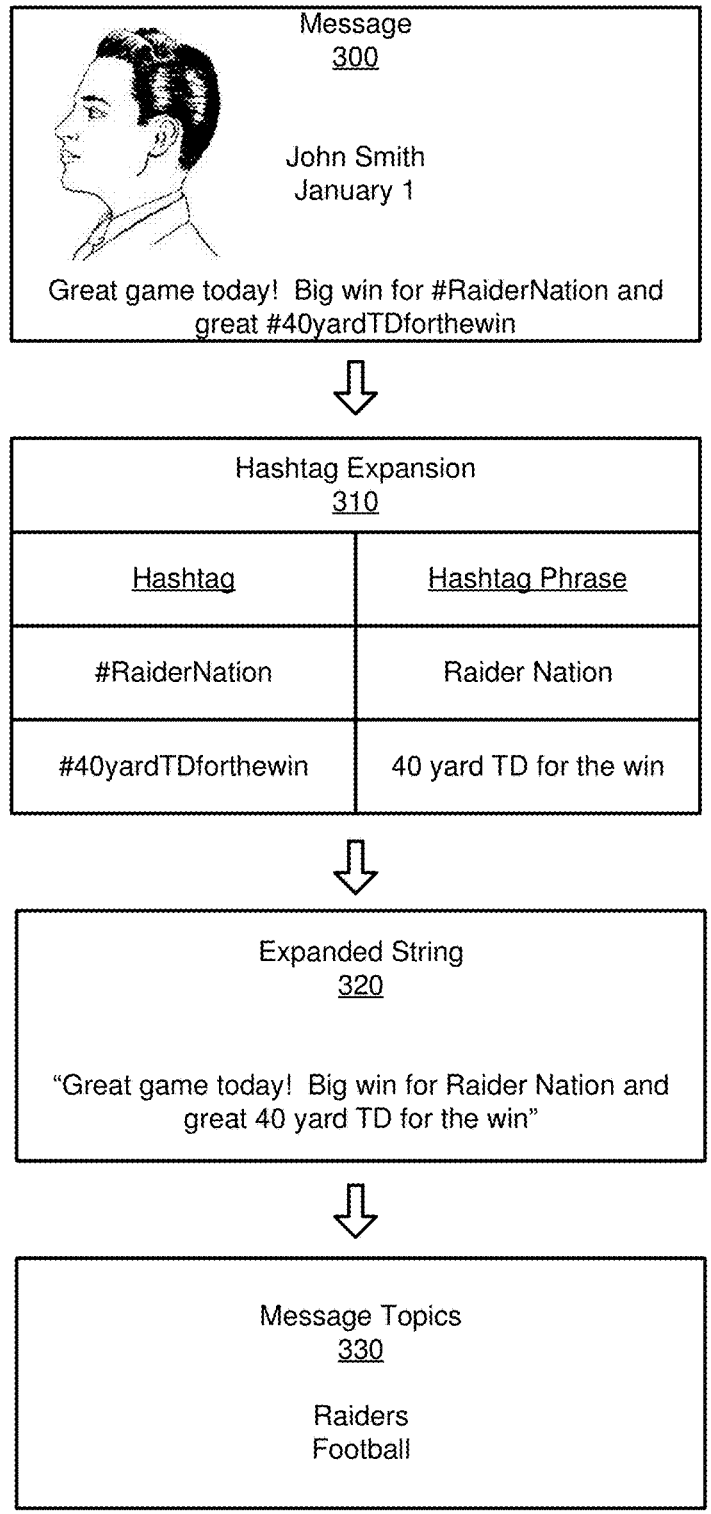
FIG. 3 shows an example application of the hashtag expansion and use in a message according to one embodiment.

FIG. 3 shows an example application of the hashtag expansion and use in a message according to one embodiment. As shown in FIG. 3, a user submits a message 300, which in this example is a status message by John Smith. The character string associated with the status message is "Great game today! Big win for #RaiderNation and great #40yardTDforthewin." The hashtag expansion module 245 identifies the hashtags in the message as #RaiderNation and #40yardTDforthewin, and generates a hashtag expansion 310 for these hashtags. Specifically, the hashtags are analyzed by the natural language model to determine the hashtag phrase as indicated above.

After generating the hashtag expansion, the hashtag expansion module 245 may generate an expanded string 320 for the message that provides the string for the message with the hashtag replaced by the associated hashtag phrase. In some examples, the hashtag and associated hashtag phrase are excluded from the string when the hashtag appears at the end of the message. For example, in some messages, users designate various hashtags at the end of a message that does not have meaning within the message itself, such as "Great time seeing a movie with Tom. #Happy." In this embodiment, the "#Happy" hashtag may be excluded from the expanded string 320 because it appears at the end of the message.

The expanded string 320 may be used in a variety of ways. One way, shown by FIG. 3, is that the expanded string 320 may be used as an input to a model or other prediction algorithm to identify message topics 330 associated with the message. The identified topics may be part of a defined set of topics, or the identified topics may correspond to objects in the social networking system. In addition, the expanded string 320 may be used as part of a feature vector for a hashtag model. The expanded string 320 permits use in the hashtag model by permitting the hashtag model to predict the presence of a hashtag while using the hashtag phrase as a part of the message string, rather than as a separate hashtag or by removing the hashtag from the string.

Returning to FIG. 2, the hashtag filtering module 250 filters hashtags that may be eligible for prediction by a hashtag model. The hashtags in messages provided by users are frequently uninteresting or low value and may not be suitable to generate a hashtag model. In particular, these hashtags may have a very low volume, such as unique or near-unique hashtags, hashtags that are associated with terms that many users do not use as a hashtag, or tags that have a relatively steady amount of use. The hashtag filtering module 250 implements one or more exclusionary filters that exclude certain hashtags from being modeled.

The hashtag modeling module 255 selects, for the hashtags eligible for modeling, a training set of data that includes messages that include the hashtag as well as messages that do not include the hashtag. The training set is used to train the hashtag model for the hashtag and store the hashtag model in the hashtag model store 240. The selection of a training set can be performed in an unsupervised manner, permitting a computer model to be trained for a hashtag without further user intervention. As a result, the configuration of the hashtag filtering module 250 ensures that those hashtags that are modeled by the hashtag modeling module 255 are more likely to be of interest. Once hashtags are trained, the social networking system 140 may automatically apply the hashtags to messages to identify hashtags that may be relevant to a message, for example to prompt a user to tag a message with a hashtag. The selection and exclusion of eligible hashtags is particularly important to ensure that the hashtags provided to the user as a suggestion is likely to be a hashtag of some interest to the user.

Figure 4:
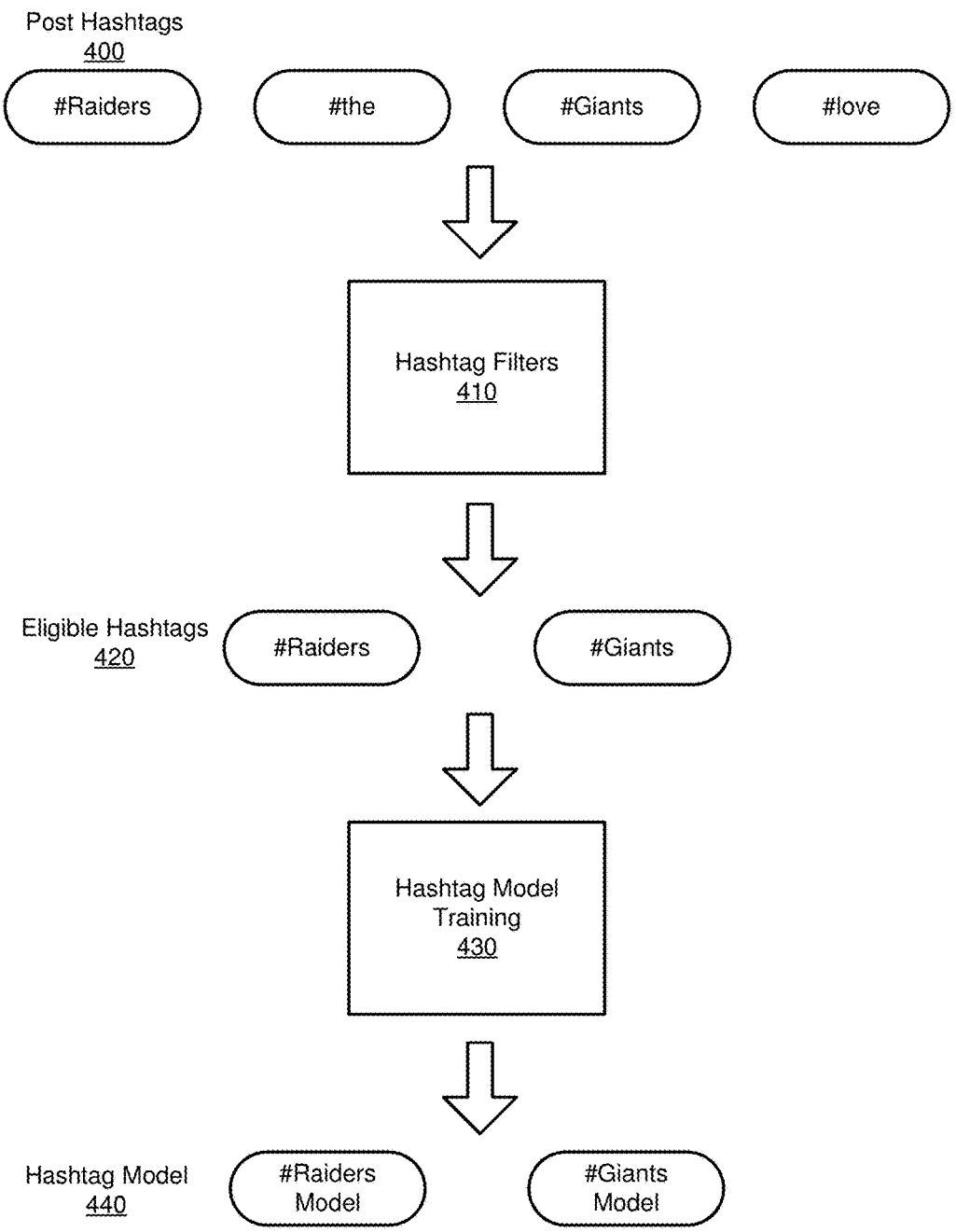
FIG. 4 shows the selection of eligible hashtags and training of eligible hashtags to generate hashtag training models.

FIG. 4 shows the selection of eligible hashtags and training of eligible hashtags to generate hashtag training models. The process shown in FIG. 4 may be performed by hashtag filtering module 250 in conjunction with hashtag modeling module 255. Initially, the messages in the social networking system 140 are associated with a set of post hashtags 400. This set of post hashtags 400 includes the hashtags associated with messages, and may include many unique or uninteresting hashtags. For example, the post hashtags may include #the or #what or other generic terms. The set of post hashtags typically include all hashtags mentioned in any message on the social networking system 140, though may include a subset of all message hashtags, for example the hash tags in all messages within a recent amount of time, such as the last six months. In this example, the post hashtags 400 include #Raiders, #the, #Giants, and #love.

Next, the set of hashtag filters 410 is applied to exclude certain hashtags that may not be of interest for automated hashtag modeling. Various filters are described with respect to FIG. 5 below. After exclusion by the hashtag filters 410, the remaining filters are eligible hashtags 420 for generating a hashtag model. In this example the eligible hashtags remaining after the hashtag filters are #Raiders and #Giants. As described with respect to the filters of FIG. 5, #the was identified in this example as too infrequently used as a hashtag, while #love was identified in this example as a hashtag that maintains a similar level of use over time. That is, hashtags in this example may be excluded when they are associated with trending upward over the recent past. When a hashtag does not demonstrate this trend, it may be excluded.

Using the eligible hashtags 420, the hashtag models are trained 430 to generate a set of hashtag models 440. Each hashtag model is trained to identify a specific hashtag of the eligible hashtags 420. In this example, a #Raiders hashtag model identifies the #Raiders hashtag, while the #Giants model identifies the #Giants hashtag.

FIG. 5 shows a hashtag data table used in some example filters for filtering eligible hashtags from a computer model. In this example, the hashtag data tables 500 and 510 maintain data for performing filtering of post hashtags 400. The hashtag filters in this example include the following filters: 1) a threshold filter, 2) a frequency filter, and 3) a trendiness filter. These filters are described in further detail below. Various configurations may include any combination of these filters and may also include further filters for selecting eligible hashtags 420.

Hashtag data tables 500 and 510 may be generated to determine whether to filter the post hashtags 400. The hashtag data table 500 maintains the hashtag along with its hashtag phrase as described with respect to FIG. 3. The hashtag data table 500 also includes the quantity (i.e., the number) of times that the hashtag and the hashtag phrase occur in messages of the social networking system 140. The quantity of the hashtag indicates the number of times that the same hashtag appears in message strings. Likewise, the quantity of the hashtag phrase indicates the number of times that the hashtag phrase appears in message strings. In some variations, the hashtag and hashtag phrase are included in the quantity even without an exact match to the hashtag or hashtag phrase. The quantity measurements may also be limited to a particular timeframe, for example the quantity that the hashtag and hashtag phrase are included in the past week or month. This data can be used to determine, for example, whether the text of the hashtag frequently appears as a hashtag, or is more often present in hashtags as a phrase.

The hashtag data table 510 maintains time-dependent data on the frequency that the hashtag appears. The time-dependent data may be segregated differently in various embodiments. In this example, the hashtag data table 510 maintains a quantity of near-term usage of the hashtag and historic quantity usage of the hashtag. The length of time that defines near-term and historic may vary according to implementation. For example, the near-term quantity in one embodiment includes the number of messages in the past week that used the hashtag, while in another example uses the last day or month. Similarly, the historic quantity may measure the same number of days as the near-term quantity (e.g., a week, day, or month). The historic and near-term quantities may also provide an average over a specific period of time. For example, the near-term quantity may provide the average use of the hashtag per day for the last 7 days, while the historic quantity may provide the average use of the hashtag per day between the last 7 and 28 days. This data can determine, for example, whether the hashtag is being used more frequently recently relative to prior mentions (whether the tag is trending).

The various filters mentioned above may use the data in hashtag data tables 500 and 510 to determine whether to exclude a hashtag. These filters may be applied by the hashtag filtering module 250. The threshold filter excludes hashtags that have a quantity of hashtag below a threshold. These hashtags are not used frequently enough to be of interest to users, and also may have insufficient data points to successfully train a hashtag model.

The frequency filter excludes hashtags based on a ratio that the hashtag appears in messages compared to the messages that include the hashtag phrase. That is, the hashtag excludes hashtags that appear as the hashtag phrase rather than as a hashtag more frequently than a threshold ratio. To apply the frequency filter, the hashtag filtering module 250 determines a frequency value by dividing the quantity of a hashtag by the quantity of the hashtag phrase. The frequency value is compared to a threshold frequency and the hashtag is excluded from the eligible hashtag set when the hashtag is below the threshold frequency.

The trendiness filter compares the near-term quantity of the hashtag against the historic quantity of the hashtag to determine whether the hashtag is trending upward in use. The hashtag filtering module 250 determines a trendiness value that indicates the near-term (recent) quantity of the hashtag relative to the historic previous quantity (prior occurrences) of the hashtag. When the trendiness value is below a threshold (i.e., the recent use of the hashtag is not sufficiently more frequent than the prior uses), the trendiness filter excludes the hashtag from inclusion in the eligible hashtag set.

Returning to FIG. 2, the model calibration module 260 provides calibration to the generated hashtag models. The hashtag models are often trained on sparse data relating to the hashtag, and the value output by the hashtag model may not accurately reflect the probability that the hashtag model predicts whether the hashtag is present in the message. The model calibration module 260 generates calibration data to more accurately predict whether the output from the computer model indicates that the message should be associated with the hashtag.

Figures 6, 7:
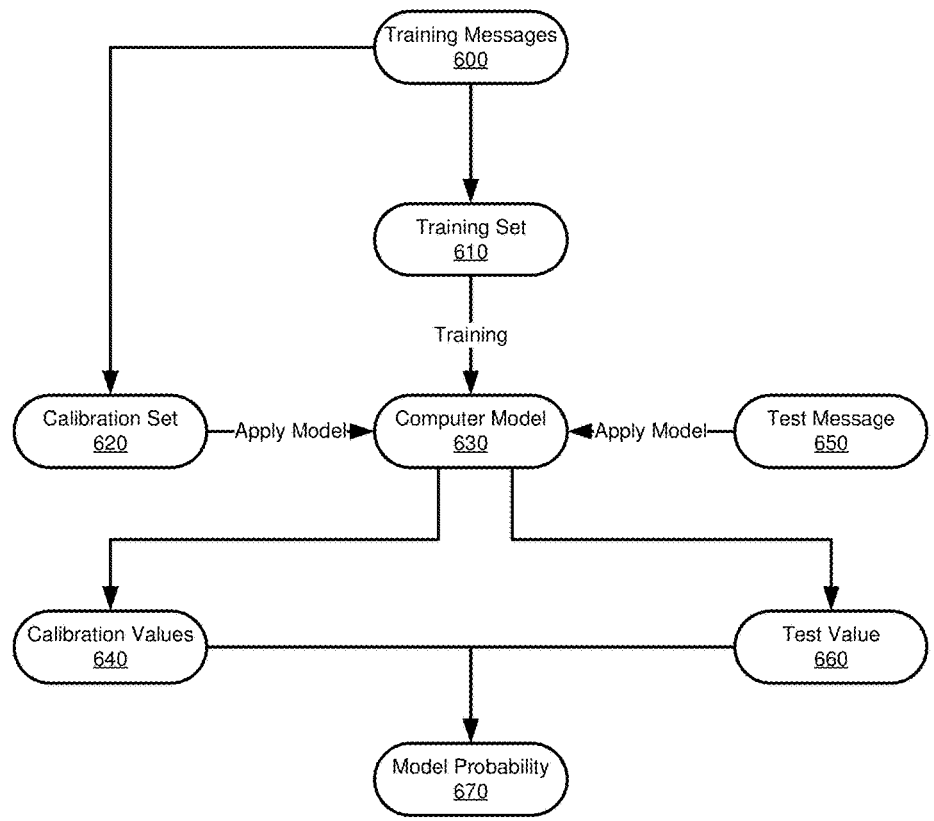
FIG. 6 shows one embodiment for the generation of calibration values and application of calibration values to identify a probability that the hashtag applies.
FIG. 7 shows an example calibration table for use with calibrating a computer model.

FIG. 6 shows one embodiment for the generation of calibration values and application of calibration values to identify a probability that the hashtag applies. After the hashtag filtering module 250 determines eligible hashtags for the computer model, the hashtag modeling module 255 identifies a set of training messages 600 to train the computer model. From among the training messages, the hashtag modeling module 255 selects a portion of the training messages 600 as a training set 610 and another portion of the training messages as a calibration set 620. The training set 610 is used to train the computer model 630 for the hashtag.

After a computer model is trained, model calibration module 260 applies the calibration set to the computer model 630 to generate a set of calibration values 640. The calibration values are the output of the computer model for the calibration set 620. The messages in the calibration set include some messages that have the hashtag, and some messages that do not have the hashtag or may otherwise indicate positive and negative examples for the hashtag. The calibration values 640 may be stored in a calibration table.

FIG. 7 shows an example calibration table 700 for use with calibrating a computer model. The calibration table includes an indication, for each message in the calibration set 620, whether the hashtag was present in the message and the resulting output from the computer model. While a small set of calibration values are shown in this example, in practice hundreds or thousands of calibration values may be generated. In this example, the computer model outputs a score between 0 and 1, which for simplicity of illustration is rounded to the nearest hundredth, though in practice may be any real number.

To apply the calibration values to a test message, 650, the model calibration module 260 applies the test message to the computer model 630 to generate a test value 660 for the test message 650. The test value 660 is the output from the computer model 630 for the test message 650. In this example, the test value is 0.55. To determine the model probability 670, the model calibration module 260 selects a set of calibration values that have calibration values similar to the test value, and determines the portion of messages with the hashtag from the messages associated with the set of selected calibration values. The portion of messages with the hashtag is treated as the model probability indicating the likelihood that the test message 650 should be associated with that hashtag. The selected calibration values may be based on a numerical range around the test value, such as ±0.10. When using the numerical range, each calibration value within that range may be selected for the set of selected calibration values. In another method, the model calibration module 260 selects a specific number of calibration values higher and a specific number lower than the test value. For example, the model calibration module 260 may select three calibration values higher and three calibration values lower than the test value.

In an example application of the calibration values 640, the test value 660 for a test message is 0.55. In this example, calibration values within 0.15 of the test value are selected in the set of calibration values. Continuing this example, the calibration values selected are 0.40, 0.45, 0.60, 0.67, and 0.70 as indicated in calibration table 700. These calibration values are associated with the hashtag in four of five of these calibration values. The percentage of the calibration values that is associated with the hashtag is treated as the model probability 670 that the test message should be associated with the hashtag. This calibration improves the computer model output and provides actual percentages of the model's predictive power for specific ranges of model output. While described with respect to hashtags and related hashtag models, the calibration methods described with respect to FIGS. 6 and 7 may be used for any computer model that provides a range of outputs, and may also be used for computer models that indicate a range or "bucket" of values for a result, rather than a real number. The test value may be used to identify a matching range or bucket of values, and the calibration values within that range used to generate a model probability 670.

In another embodiment using these calibration values, a mapping may be generated for the calibration table that maps possible test values to calibrated (adjusted) outputs. For example, the mapping may be generated by identifying a set of mapping values, such as values that span the range of outputs of the computer model. Thus, if the computer model may output values in the range between 0 and 1, the mapping may identify mapping values between 0 and 1 at intervals such as 0.1 or 0.05. For each mapping value, a group of calibration values is selected and the adjusted model probability 670 determined as described above. Then, when a test value 660 is received, a mapping value is identified that matches or nearly matches the test value and used to provide an adjustment for the test value. Alternatively, rather than identifying a mapping value, the mapping values are converted to a mapping function, and the test value is applied to the mapping function to determine the adjustment. In this way, the mapping between test values and model probabilities 670 can be precomputed and does not require a look-up to the calibration table 700 to determine the model probability when each message is analyzed.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving a message in an online system, the message including a hashtag character and a string of characters;
   determining a set of candidate phrases that each match one or more words identified from a subset of the string of characters;
   scoring each of the candidate phrases based on frequencies at which the candidate phrases occur in a sample of messages of the online system;
   selecting a candidate phrase of the set of candidate phrases based on the scoring; and
   predicting a topic of the message by providing the selected candidate phrase as input to a model configured to predict associations of hashtag phrases with message topics, the model trained using feature vectors including a plurality of hashtag phrases received from users of the online system.

2. The method of claim 1, wherein each of the candidate phrases is scored using a natural language model.

3. The method of claim 2, wherein the natural language model is trained using the sample of messages.

4. The method of claim 1, wherein the model is further trained using a calibration set including a first topic associated with a candidate hashtag phrase and a second topic not associated with the candidate hashtag phrase.

5. The method of claim 1, wherein each of the one or more words identified from the subset of the string of characters are not separated by a whitespace character, and wherein the string of characters is subsequent to the hashtag character.

6. The method of claim 1, further comprising:
  determining an object of the online system associated with the selected candidate phrase, wherein the message is received from a client device of a user of the online system, and wherein the user performed an action with the object on the online system.

7. The method of claim 6, further comprising:
  determining that one or more users of the online system connected to the user on the online system performed one or more actions with the object on the online system.

8. The method of claim 1, further comprising:
  filtering the set of candidate phrases based on frequencies of each of the candidate phrases over a predetermined duration of time in the sample of messages of the online system, wherein at least one of the candidate phrases is excluded responsive to determining that the corresponding frequency is less than a threshold value.

9. The method of claim 1, further comprising:
  filtering the set of candidate phrases based on a trendiness of each of the candidate phrases, wherein the trendiness of a candidate phrase is determined based on a recent frequency of the candidate phrase relative to a historical frequency of the candidate phrase in the sample of messages of the online system.

10. A non-transitory computer-readable storage medium storing instructions that, when executed by a processor, cause the processor to perform steps including:
  receiving a message in an online system, the message including a hashtag character and a string of characters;
  determining a set of candidate phrases that each match one or more words identified from a subset of the string of characters;
  scoring each of the candidate phrases based on frequencies at which the candidate phrases occur in a sample of messages of the online system;
  selecting a candidate phrase of the set of candidate phrases based on the scoring; and
  predicting a topic of the message by providing the selected candidate phrase as input to a model configured to predict associations of hashtag phrases with message topics, the model trained using feature vectors including a plurality of hashtag phrases received from users of the online system.

11. The non-transitory computer-readable storage medium of claim 10, wherein each of the candidate phrases is scored using a natural language model.

12. The non-transitory computer-readable storage medium of claim 11, wherein the natural language model is trained using the sample of messages.

13. The non-transitory computer-readable storage medium of claim 10, wherein the model is further trained using a calibration set including a first topic associated with a candidate hashtag phrase and a second topic not associated with the candidate hashtag phrase.

14. The non-transitory computer-readable storage medium of claim 10, wherein each of the one or more words identified from the subset of the string of characters are not separated by a whitespace character, and wherein the string of characters is subsequent to the hashtag character.

15. The non-transitory computer-readable storage medium of claim 10, storing further instructions that, when executed by the processor, cause the processor to perform steps including:
  determining an object of the online system associated with the selected candidate phrase, wherein the message is received from a client device of a user of the online system, and wherein the user performed an action with the object on the online system.

16. The non-transitory computer-readable storage medium of claim 15, storing further instructions that, when executed by the processor, cause the processor to perform steps including:
  determining that one or more users of the online system connected to the user on the online system performed one or more actions with the object on the online system.

17. The non-transitory computer-readable storage medium of claim 10, storing further instructions that, when executed by the processor, cause the processor to perform steps including:
  filtering the set of candidate phrases based on frequencies of each of the candidate phrases over a predetermined duration of time in the sample of messages of the online system, wherein at least one of the candidate phrases is excluded responsive to determining that the corresponding frequency is less than a threshold value.

18. The non-transitory computer-readable storage medium of claim 10, storing further instructions that, when executed by the processor, cause the processor to perform steps including:
  filtering the set of candidate phrases based on a trendiness of each of the candidate phrases, wherein the trendiness of a candidate phrase is determined based on a recent frequency of the candidate phrase relative to a historical frequency of the candidate phrase in the sample of messages of the online system.

* * * * *